(12) United States Patent
Lee et al.

(10) Patent No.: US 11,147,096 B2
(45) Date of Patent: Oct. 12, 2021

(54) METHOD FOR TRANSMITTING AND RECEIVING SIGNALS IN A WIRELESS COMMUNICATION SYSTEM AND A DEVICE THEREFOR

(71) Applicant: LG ELECTRONICS INC., Seoul (KR)

(72) Inventors: Jaewook Lee, Seoul (KR); Youngdae Lee, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 27 days.

(21) Appl. No.: 16/629,024

(22) PCT Filed: Aug. 7, 2018

(86) PCT No.: PCT/KR2018/008950
§ 371 (c)(1),
(2) Date: Jan. 6, 2020

(87) PCT Pub. No.: WO2019/031808
PCT Pub. Date: Feb. 14, 2019

(65) Prior Publication Data
US 2020/0178290 A1 Jun. 4, 2020

Related U.S. Application Data
(60) Provisional application No. 62/541,785, filed on Aug. 7, 2017.

(51) Int. Cl.
*H04W 72/12* (2009.01)
*H04W 4/40* (2018.01)
*H04W 74/08* (2009.01)

(52) U.S. Cl.
CPC ......... *H04W 72/1289* (2013.01); *H04W 4/40* (2018.02); *H04W 74/0841* (2013.01)

(58) Field of Classification Search
CPC ............... H04W 4/40; H04W 72/1278; H04W 72/1289; H04W 74/0841; H04W 92/18
See application file for complete search history.

(56) References Cited

U.S. PATENT DOCUMENTS

2012/0230238 A1* 9/2012 Dalsgaard ............. H04L 1/0027
370/311
2017/0188391 A1* 6/2017 Rajagopal ......... H04W 74/0816
(Continued)

FOREIGN PATENT DOCUMENTS

WO 2017078783 5/2017

OTHER PUBLICATIONS

PCT International Application No. PCT/KR2018/008950, Notification of Transmittal of the International Search Report and the Written Opinion of the International Searching Authority, or Declaration dated Nov. 28, 2018, 12 pages.
(Continued)

*Primary Examiner* — Kashif Siddiqui
(74) *Attorney, Agent, or Firm* — Lee, Hong, Degerman, Kang & Waimey

(57) ABSTRACT

The present invention relates to a wireless communication system. More specifically, the present invention relates to a method and a device for transmitting assistance information to a network/base station when a condition is satisfied. Whether the condition is satisfied or not is determined based on scheduling information from the network/base station and control information from another device.

12 Claims, 13 Drawing Sheets

(56) References Cited

U.S. PATENT DOCUMENTS

| | | | |
|---|---|---|---|
| 2019/0058986 A1* | 2/2019 | Loehr | H04L 1/1825 |
| 2019/0090250 A1* | 3/2019 | Lee | H04W 72/0446 |
| 2019/0306912 A1* | 10/2019 | Cheng | H04W 76/11 |
| 2019/0320415 A1* | 10/2019 | Seo | H04W 76/14 |
| 2020/0107297 A1* | 4/2020 | Wang | H04W 72/02 |
| 2020/0383088 A1* | 12/2020 | Min | H04W 72/02 |

OTHER PUBLICATIONS

Ericsson, "Radio resource pool sharing between mode 3 and mode 4 UEs", 3GPP TSG RAN WG1 Meeting #89, R1-1708942, May 2017, 4 pages.

Xinwei, "Discussion on resource pool sharing between Mode 3 and Mode 4", 3GPP TSG RAN WG1 Meeting #89, R1-1707106, May 2017, 3 pages.

Sony, "Discussion on sidelink resource allocation and configuration", 3GPP TSG RAN WG1 Meeting #89, R1-1708264, 6 pages.

Panasonic, "Discussion on SPS mechanism supported in V2V", 3GPP TSG RAN WG1 Meeting #84, R1-160722, Feb. 2016, 3 pages.

\* cited by examiner (a) Control-Plane Protocol Stack (b) User-Plane Protocol Stack (a) Control-Plane Protocol Stack (b) User-Plane Protocol Stack (a)

(b)

METHOD FOR TRANSMITTING AND RECEIVING SIGNALS IN A WIRELESS COMMUNICATION SYSTEM AND A DEVICE THEREFOR

CROSS-REFERENCE TO RELATED APPLICATIONS

This application is the National Stage filing under 35 U.S.C. 371 of International Application No. PCT/KR2018/008950, filed on Aug. 7, 2018, which claims the benefit of U.S. Provisional Application No. 62/541,785, filed on Aug. 7, 2017, the contents of which are all hereby incorporated by reference herein in their entirety.

TECHNICAL FIELD

The present invention relates to a wireless communication system and, more particularly, to a method for transmitting and receiving a signal for sidelink or V2X communication in a wireless communication system and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an Evolved Universal Mobile Telecommunications System (E-UMTS) as an exemplary radio communication system. The E-UMTS is an advanced version of a conventional Universal Mobile Telecommunications System (UMTS) and basic standardization thereof is currently underway in the 3GPP. E-UMTS may be generally referred to as a Long Term Evolution (LTE) system. The communication network is widely deployed to provide a variety of communication services such as voice (VoIP) through IMS and packet data.

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE and NR based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication (NR, New Radio). In addition, a communication system design considering a service/UE sensitive to reliability and latency is being discussed. The introduction of next-generation RAT, which takes into account such Enhanced Mobile BroadBand (eMBB) transmission, and ultra-reliable and low latency communication (URLLC) transmission, is being discussed.

Device-to-Device (D2D) communication is a communication scheme in which a direct link is established between User Equipments (UEs) and the UEs exchange voice and data directly without an evolved Node B (eNB). D2D communication may cover UE-to-UE communication and peer-to-peer communication. In addition, D2D communication may be applied to Machine-to-Machine (M2M) communication and Machine Type Communication (MTC).

DISCLOSURE

Technical Problem

Based on the aforementioned discussion, a method of transmitting a signal for D2D or Vehicle-to-Everythig (V2X) communication in a wireless communication system and an apparatus therefor are proposed in the following.

The technical problems solved by the present invention are not limited to the above technical problems and those skilled in the art may understand other technical problems from the following description.

Technical Solution

As an aspect of the present invention, a method for a user equipment (UE) to perform a handover procedure in a wireless communication system is provided, wherein the method comprises: receiving, from a base station (BS), scheduling information indicating one or more first resources to be used by the UE for a first sidelink transmission; receiving, from another UE, sidelink control information (SCI) indicating one or more second resources to be used by an another UE for a second sidelink transmission; and transmitting, to the BS, assistance information on collision expected between the first sidelink transmission and the second sidelink transmission based on the scheduling information and the SCI when a condition is satisfied.

Preferably, wherein the one or more second resources are periodically configured.

Preferably, the method may further comprise: receiving, from the BS, threshold information including a threshold value; wherein the assistance information is transmitted when a number of expected collisions is equal to or larger than the threshold value.

Preferably, the method may further comprise: receiving, from the BS, downlink control information (DCI) for activating at least one SPS configuration, wherein the at least one semi-persistent scheduling (SPS) configuration is included in the scheduling information, wherein the number of expected collisions is counted per an activated one of the at least one SPS configuration, wherein the assistance information includes an index of a SPS configuration in which the number of expected collisions is equal to or larger than the threshold value.

Preferably, the threshold information includes at least one of: priority information associated with the threshold value, and service/application information associated with the threshold value.

Preferably, the assistance information includes at least one of: the number of expected collisions, a system frame number of one or more first resources that the collision expected, a subframe number of the one or more first resources that the collision expected, a bitmap of the one or more first resources that the collision expected, and a channel busy ratio for a sidelink resource pool.

Preferably, the method may further comprise: skipping transmission of sidelink signal at one or more first resources that the collision expected.

As another aspect of the present invention, a User Equipment (UE) for operating in a wireless communication system is provided, wherein the UE comprises: a radio frequency (RF) unit; and a processor, wherein the processor is configured to receive, from a base station (BS), scheduling information indicating one or more first resources to be used by the UE for a first sidelink transmission, and receive, from another UE, sidelink control information (SCI) indicating one or more second resources to be used by an another UE for a second sidelink transmission, transmit, to the BS, to the BS, assistance information on collision expected between the first sidelink transmission and the second sidelink transmission based on the scheduling information and the SCI when a condition is satisfied.

Preferably, the one or more second resources are periodically configured.

Preferably, the processor may be further configured to: receive, from the BS, threshold information including a threshold value, wherein the assistance information is transmitted when a number of expected collisions is equal to or larger than the threshold value.

Preferably, the processor may be further configured to: receive, from the BS, downlink control information (DCI) for activating at least one SPS configuration, wherein the at least one semi-persistent scheduling (SPS) configuration is included in the scheduling information, wherein the number of expected collisions is counted per an activated one of the at least one SPS configuration, and the assistance information includes an index of a SPS configuration in which the number of expected collisions is equal to or larger than the threshold value.

Preferably, the threshold information includes at least one of: priority information associated with the threshold value, and service/application information associated with the threshold value.

Preferably, the assistance information includes at least one of: the number of expected collisions, a system frame number of one or more first resources that the collision expected, a subframe number of the one or more first resources that the collision expected, a bitmap of the one or more first resources that the collision expected, and a channel busy ratio for a sidelink resource pool.

Preferably, the processor may be further configured to: skip transmission of sidelink signal at one or more first resources that the collision expected.

Advantageous Effects

According to the present invention, it is able to efficiently transmit and receive a signal for sidelink or V2X communication in a wireless communication system.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

MODE FOR INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
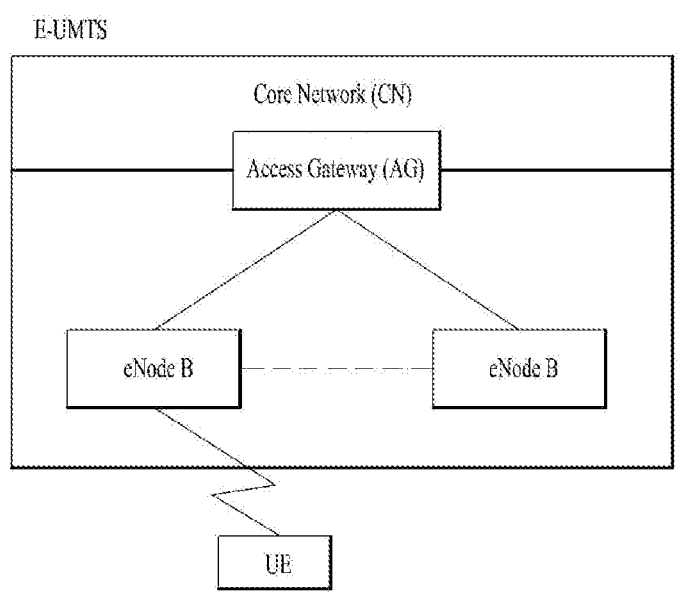
FIG. 1 is a diagram showing a network structure of an Evolved Universal Mobile Telecommunications System (E-UMTS) as an example of a wireless communication system.
Figure 2A:
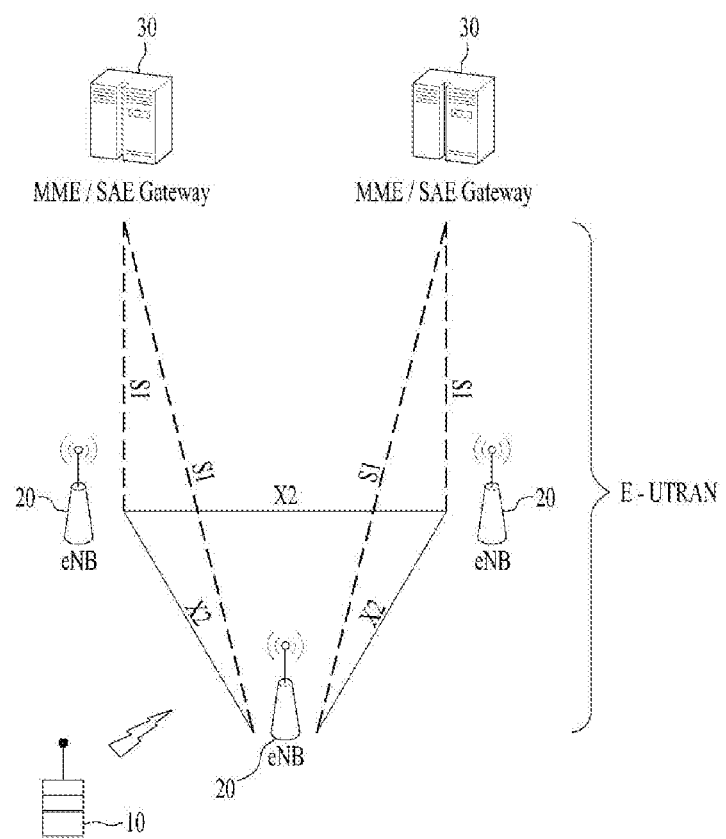
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
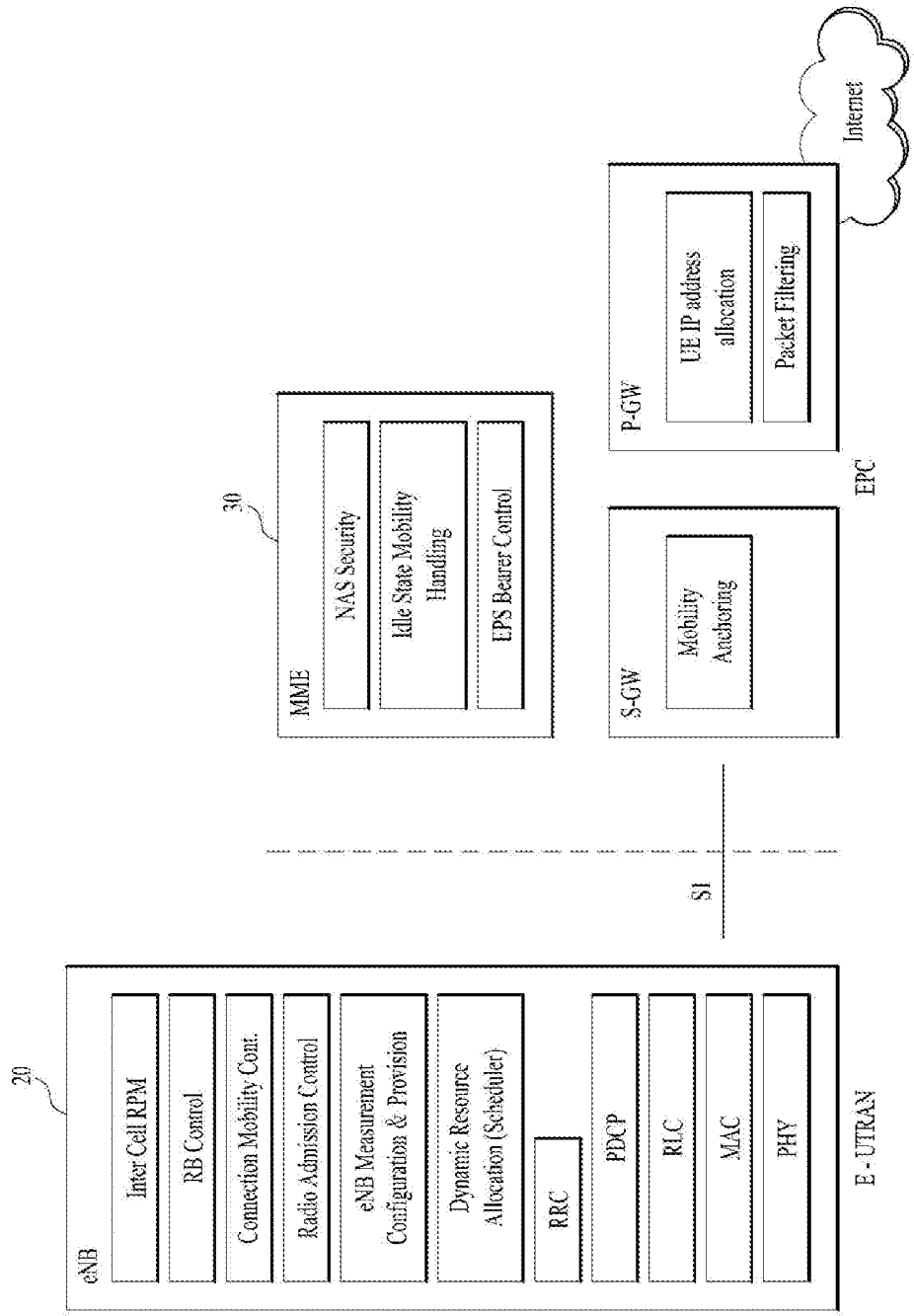
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an Si interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
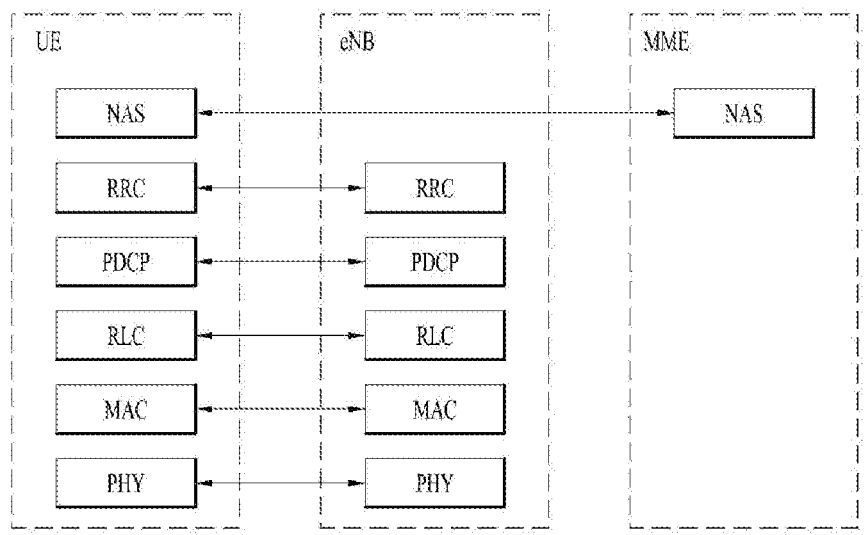
FIG. 3 is a diagram showing a control plane and a user plane of a radio interface protocol between a UE and an E-UTRAN based on a 3rd generation partnership project (3GPP) radio access network standard.
Figure 3:
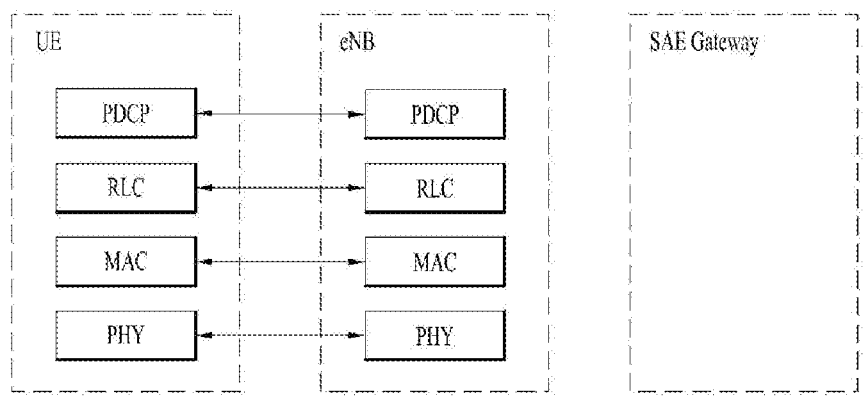

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4A:
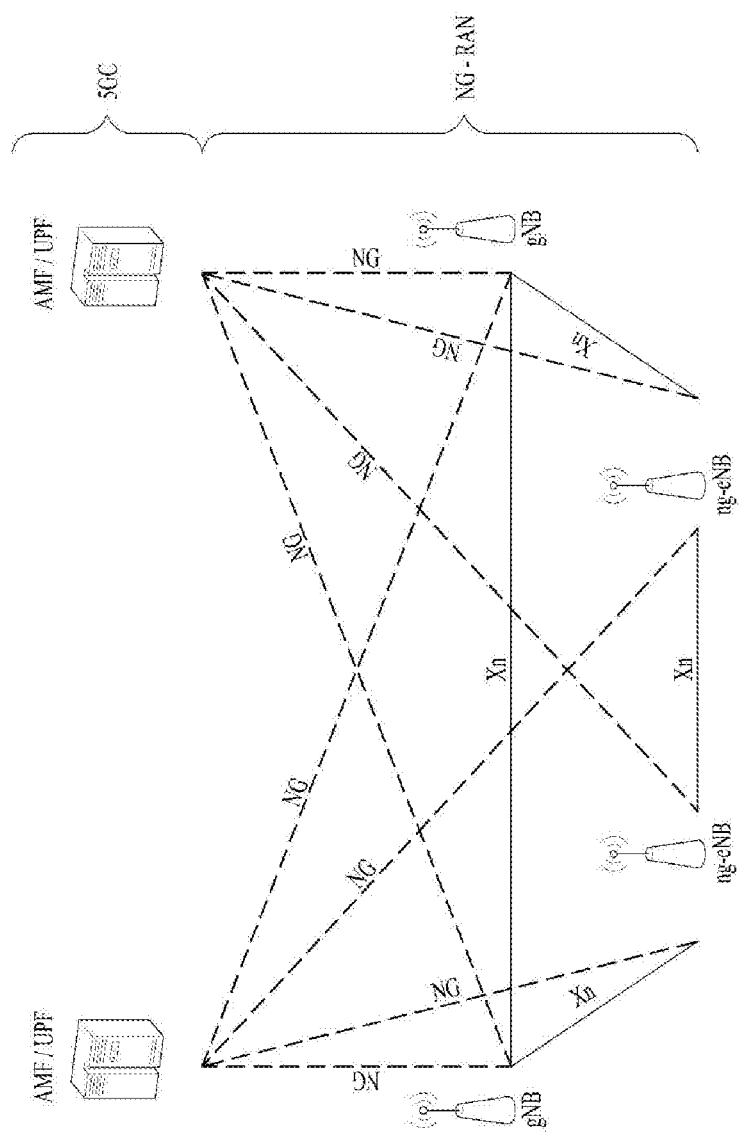
FIG. 4A is a block diagram illustrating network structure of NG Radio Access Network (NG-RAN) architecture.
Figure 4B:
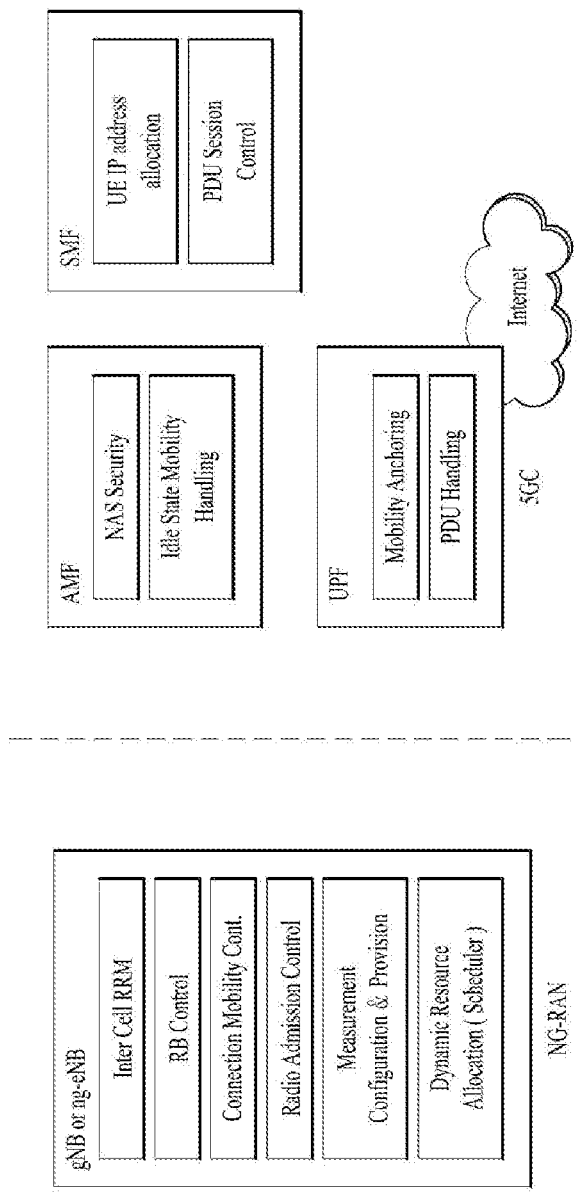
FIG. 4B is a block diagram depicting architecture of functional Split between NG-RAN and 5G Core Network (5GC).

FIG. 4A is a block diagram illustrating network structure of NG Radio Access Network (NG-RAN) architecture, and FIG. 4B is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signalling protocol is referred to as XnAP (Xn Application Protocol). The SCTP layer provides the guaranteed delivery of application layer messages. In the transport IP layer point-to-point transmission is used to deliver the signalling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signalling messages, SCTP is added on top of IP. The application layer signalling protocol is referred to as NGAP (NG Application Protocol). The SCTP layer provides guaranteed delivery of application layer messages. In the transport, IP layer point-to-point transmission is used to deliver the signalling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

Figure 5:
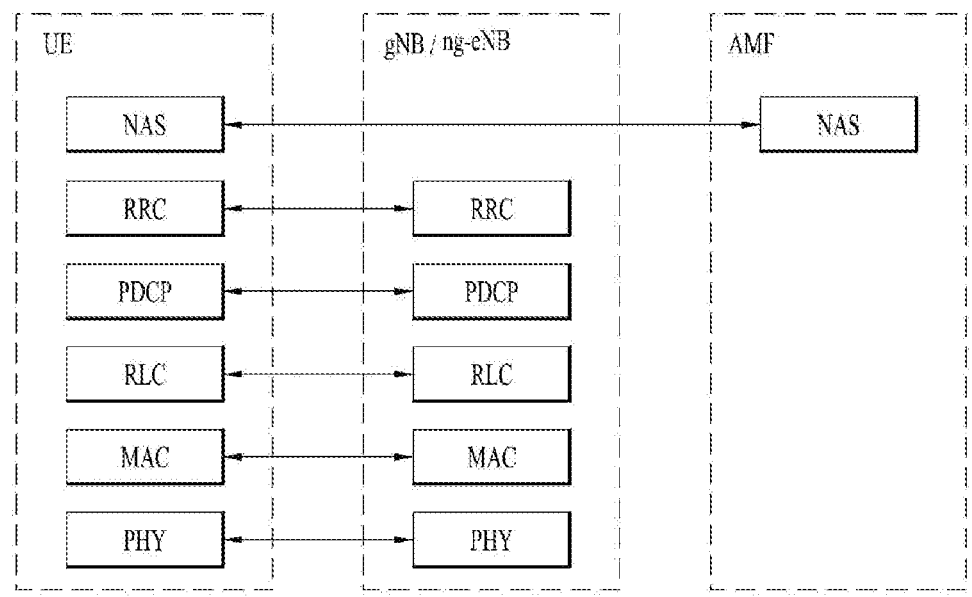
FIG. 5 is a diagram showing a control plane and a user plane of a radio interface protocol between a UE and a NG-RAN based on a 3rd generation partnership project (3GPP) radio access network standard.
Figure 5:
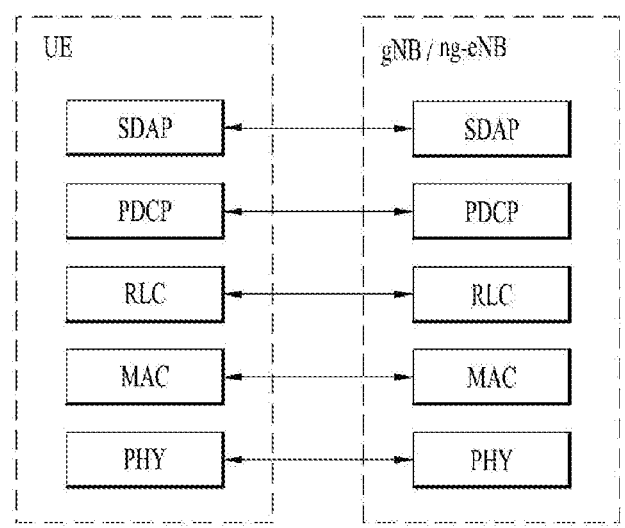

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

D2D Transmission and Resource Pool

In the following description, a D2D (UE-to-UE communication) communication is explained.

A D2D communication scheme is mainly divided into a scheme of receiving help from a network/coordination station (e.g., a base station) and a scheme not receiving help from the network/coordination station.

Figure 6:
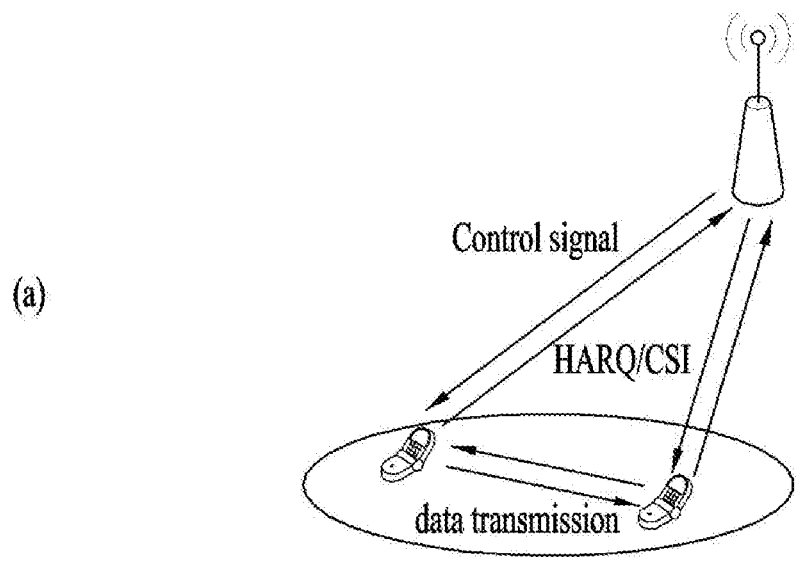
FIG. 6 is a diagram for explaining D2D communication.
Figure 6:
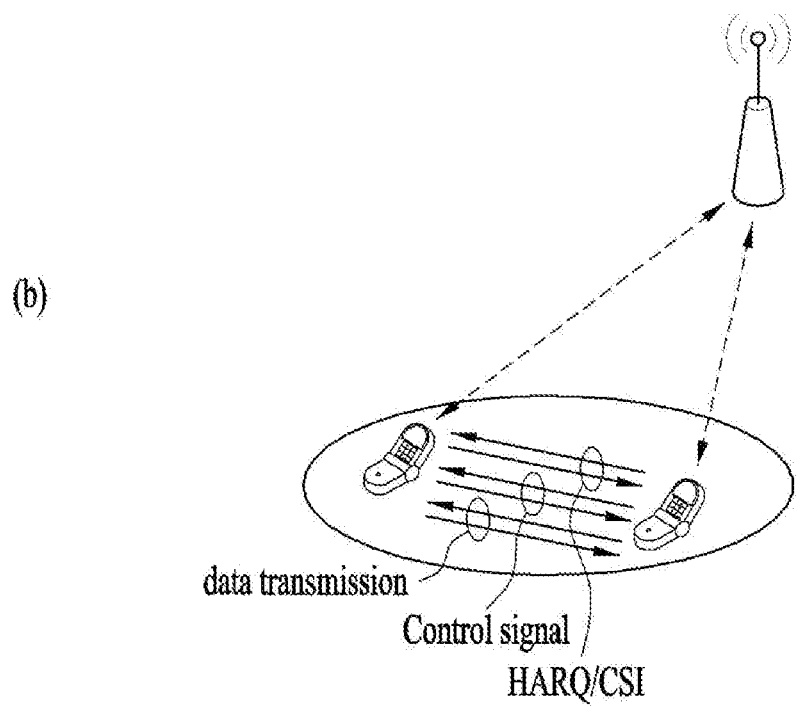

Referring to FIG. 6, FIG. 6 (*a*) shows a scheme that the network/coordination station involves in transmitting and receiving a control signal (e.g., a grant message), HARQ, channel state information, and the like and data is transmitted and received only between UEs performing D2D communication. FIG. 6 (*b*) shows a scheme that the network provides minimum information (e.g., D2D connection information capable of being used in a corresponding cell, etc.) to UEs and the UEs performing D2D communication form a link and perform data transmission and reception.

Figure 7:
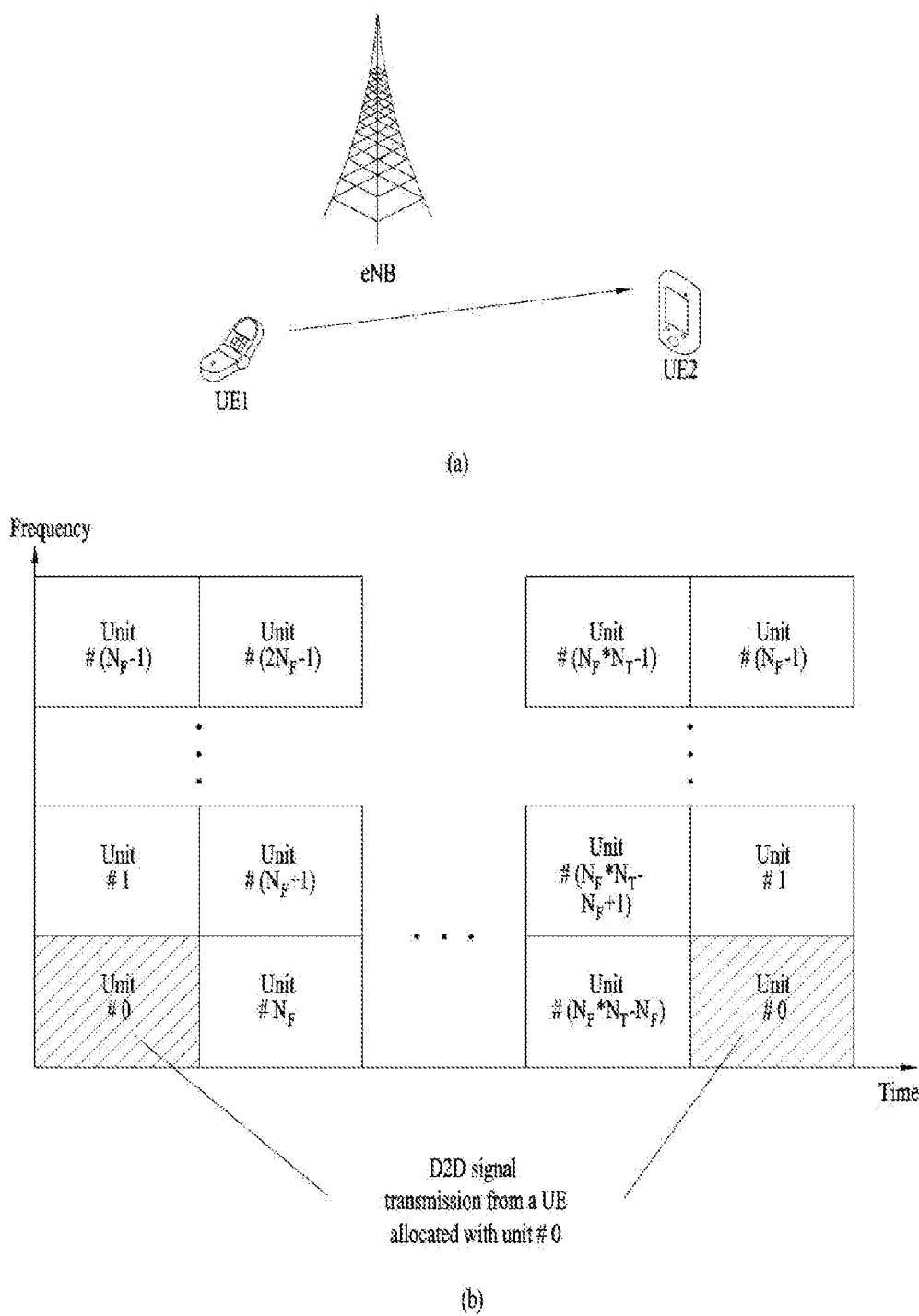
FIG. 7 is a diagram for an example of a D2D resource pool for performing D2D communication.

FIG. 7 shows an example of a UE1, a UE2 and a resource pool used by the UE1 and the UE2 performing D2D communication. In FIG. 7 (*a*), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 7 (*b*) shows an example of configuring a resource unit. Referring to FIG. 7 (*b*), the entire frequency resources are divided into the NF number of resource units and the entire time resources are divided into the NT number of resource units. In particular, it is able to define NF*NT number of resource units in total. In particular, a resource pool can be repeated with a period of NT subframes. Specifically, as shown in FIG. 7, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like.

For clarity, a method for an eNB to directly designate a transmission resource of a D2D transmission UE is referred to as a mode 1 (or transmission mode 1, TM1). If a transmission resource region is configured in advance or an eNB designates the transmission resource region and a UE directly selects a transmission resource from the transmission resource region, it is referred to as a mode 2 (or transmission mode 2, TM2).

In case of performing D2D discovery, if an eNB directly indicates a resource, it is referred to as a type 2. If a UE directly selects a transmission resource from a predetermined resource region or a resource region indicated by the eNB, it is referred to as a type 1.

Support for V2X Sidelink Services

Figure 8:
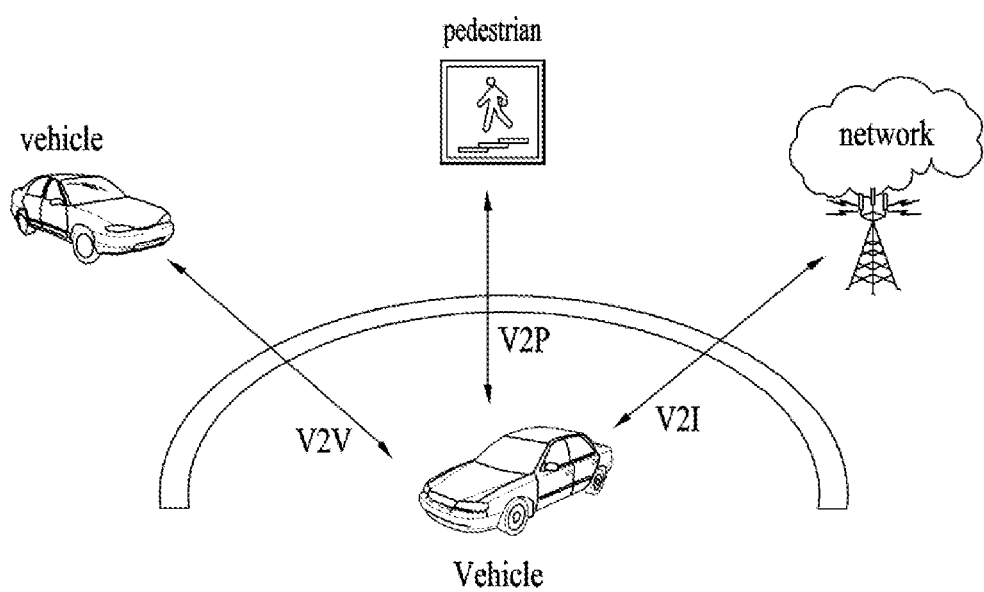
FIG. 8 is a diagram for explaining a V2X scenario.

FIG. 8 is a diagram illustrating V2X (vehicle to everything) communication environment.

An LTE-based V2X (vehicle-to-everything) communication technology started from 3GPP also reflects the tendency that an IT (information technology) is incorporated into a vehicle. A connectivity function is mainly applied to a certain type of vehicle and ongoing effort to support V2V (vehicle-to-vehicle) communication, V2I (vehicle-to-infrastructure) communication, V2P (vehicle-to-pedestrian) communication, and V2N (vehicle-to-network) in LTE and NR based V2X communication is in progress via the evolution of the connectivity function.

V2X services can be provided by PC5 interface and/or Uu interface. Support of V2X services via PC5 interface is provided by V2X sidelink communication, which is a mode of communication whereby UEs can communicate with each other directly over the PC5 interface. This communication mode is supported when the UE is served by E-UTRAN and when the UE is outside of E-UTRA coverage. Only the UEs authorised to be used for V2X services can perform V2X sidelink communication.

The user plane protocol stack and functions re also used for V2X sidelink communication. In addition, for V2X sidelink communication:

STCH for sidelink communication is also used for V2X sidelink communication.

Non-V2X (e.g. Public Safety) data is not multiplexed with V2X data transmitted in resources configured for V2X sidelink communication.

The Access Stratum (AS) is provided with the PPPP of a protocol data unit transmitted over PC5 interface by higher layers. The packet delay budget (PDB) of the protocol data unit can be determined from the PPPP. The low PDB is mapped to the high priority PPPP value. The existing logical channel prioritization based on PPPP is used for V2X sidelink communication.

Control plane protocol stack for SBCCH is also used for V2X sidelink communication.

In order to assist the eNB to provide sidelink resources, the UE in RRC_CONNECTED may report geographical location information to the eNB. The eNB can configure the UE to report the complete UE geographical location information based on periodic reporting via the existing measurement report signaling.

Geographical zones can be configured by the eNB or pre-configured. When zones are configured, the world is divided into geographical zones using a single fixed reference point (i.e. geographical coordinates (0, 0)), length and width. The UE determines the zone identity by means of modulo operation using length and width of each zone, number of zones in length, number of zones in width and the single fixed reference point. The length and width of each zone, number of zones in length and number of zones in width are provided by the eNB when the UE is in coverage and pre-configured when the UE is out of coverage. The zone is configurable for both in coverage and out of coverage.

For in coverage UE, when the UE uses UE autonomous resource selection, the eNB can provide the mapping between zone(s) and V2X sidelink transmission resource pools in SIB21. For out of coverage UEs, the mapping between the zone(s) and V2X sidelink transmission resource pools can be pre-configured. If a mapping between zone(s) and V2X sidelink transmission resource pool is (pre-)configured, the UE selects transmission sidelink resources from the resource pool corresponding to the zone where it is currently located. The zone concept is not applied to exceptional V2X sidelink transmission pools as well as reception pools. Resource pools for V2X sidelink communication are not configured based on priority.

For V2X sidelink transmission, during handover, transmission resource pool configurations including exceptional transmission resource pool for the target cell can be signaled in the handover command to reduce the transmission interruption. In this way, the UE may use the transmission sidelink resource pools of the target cell before the handover is completed as long as either synchronization is performed with the target cell in case eNB is configured as synchronization source or synchronization is performed with GNSS in case GNSS is configured as synchronization source. If the exceptional transmission resource pool is included in the handover command, the UE starts using randomly selected resources from the exceptional transmission resource pool starting from the reception of handover command. If the UE is configured with scheduled resource allocation in the handover command, the UE continues to use the exceptional transmission resource pool while the timer associated with handover is running. If the UE is configured with autonomous resource selection in the target cell the UE continues to use the exceptional transmission resource pool until the sensing results on the transmission resource pools for autonomous resource selection are available. For exceptional cases (e.g. during RLF, during transition from RRC IDLE to RRC CONNECTED or during change of dedicated sidelink resource pools within a cell), the UE may select resources in the exceptional pool provided in serving cell's SIB21 based on random selection, and uses them temporarily. During cell reselection, the RRC_IDLE UE may use the randomly selected resources from the exceptional transmission resource pool of the reselected cell until the sensing results on the transmission resource pools for autonomous resource selection are available.

In order to avoid interruption time in receiving V2X messages due to delay in acquiring reception pools broadcasted from the target cell, synchronisation configuration and reception resource pool configuration for the target cell can be signaled to RRC_CONNECTED UEs in the handover command. For RRC_IDLE UE, it is up to UE implementation to minimize sidelink transmission/reception interruption time associated with acquisition of SIB21 of the target cell.

A UE is considered in-coverage on the carrier used for V2X sidelink communication whenever it detects a cell on that carrier as per criteria. If the UE that is authorized for V2X sidelink communication is in-coverage for V2X sidelink communication it may use scheduled resource allocation or UE autonomous resource selection as per eNB configuration. A set of transmission and reception resource pools when the UE is out of coverage for V2X sidelink communication may be pre-configured in the UE. V2X sidelink communication resources are not shared with other non-V2X data transmitted over sidelink.

An RRC_CONNECTED UE may send a Sidelink UE Information message to the serving cell if it is interested in V2X sidelink communication transmission in order to request sidelink resources.

If the UE is configured by higher layers to receive V2X sidelink communication and V2X sidelink reception resource pools are provided, the UE receives on those provided resources.

Reception of sidelink V2X communication in different carriers/PLMNs can be supported by having multiple receiver chains in the UE.

The serving cell can provide synchronization configuration for the carrier used for V2X sidelink communication. In this case, the UE follows the synchronization configuration received from serving cell. In case there is no cell detected on the carrier used for V2X sidelink communication and the UE does not receive synchronization configuration from serving cell, the UE follows preconfigured synchronization configuration. There are three types of synchronization reference, namely eNB, UE and GNSS. In case GNSS is configured as synchronization source, the UE utilizes the UTC time and (pre)configured DFN offset to calculate direct frame number and subframe number. In case eNB timing is configured as synchronization reference to the UE, the UE follows PCell (RRC_CONNECTED)/serving cell (RRC_IDLE) for synchronization and DL measurements. UE can indicate the current synchronization reference type it is using to the PCell.

For controlling channel utilization, the network is able to indicate how the UE adapts its transmission parameters for each transmission pool depending on the Channel Busy Ratio (CBR). The UE measures all the configured transmission pools including exceptional pool. Only data pool is measured for the case SA pool and data pool resources are located adjacently while SA pool and data pool is measured separately for the case SA pool and data pool are located non-adjacently.

A UE in RRC_CONNECTED can be configured to report CBR measurement results. For CBR reporting, periodic reporting and event triggered reporting are supported. Two new reporting events defined only for the data pool are introduced for event-triggered CBR reporting. CBR event-triggered reporting is triggered by overloaded threshold and/or less-loaded threshold. The network can configure which of the transmission pools the UE needs to report.

A UE (regardless of its RRC state) performs transmission parameter adaptation based on the CBR. The exemplary adapted transmission parameters include maximum transmission power, range of the number of retransmission per TB, range of PSSCH RB number, range of MCS, maximum limit on channel occupancy ratio. The transmission parameter adaption applies to all transmission pools including exceptional pool.

Sidelink transmission and/or reception resources including exceptional pool for different frequencies for scheduled resource allocation and UE autonomous resource selection may be provided. The sidelink resources for different frequencies can be provided via dedicated signalling, SIB21 and/or preconfiguration. The serving cell may indicate to the UE only the frequency on which the UE may acquire the sidelink resource configuration. If multiple frequencies and associated resource information are provided, it is up to UE implementation to select the frequency among the provided frequencies. The UE shall not use preconfigured transmission resource if the UE detects a cell providing resource configuration or inter-carrier resource configuration for V2X sidelink communication. Frequencies which may provide V2X sidelink communication resource configuration or cross-carrier configuration can be pre-configured. The RRC_IDLE UE may prioritize the frequency that provides resource configuration for V2X sidelink communication for other carrier during cell reselection.

If the UE supports multiple transmission chains, it may simultaneously transmit on multiple carriers via PC5. For the case where multiple frequencies for V2X are supported, a mapping between service types and V2X frequencies is configured by upper layers. The UE should ensure a service to be transmitted on the corresponding frequency.

The UE may receive the V2X sidelink communication of other PLMNs. The serving cell can indicate to the UE the RX resource configuration for inter-PLMN operation directly or only the frequency on which the UE may acquire the inter-PLMN sidelink resource configuration. Sidelink transmission in other PLMNs is not allowed.

When UL transmission overlaps in time domain with V2X sidelink transmission in the same frequency, the UE prioritizes the sidelink transmission over the UL transmission if the PPPP of sidelink MAC PDU is lower than a (pre)configured PPPP threshold. When UL transmission overlaps in time domain with sidelink transmission in different frequency, the UE may prioritize the sidelink transmission over the UL transmission or reduce UL transmission power if the PPPP of sidelink MAC PDU is lower than a (pre)configured PPPP threshold. However, if UL transmission is prioritized by upper layer or RACH procedure is performed, the UE prioritizes UL transmission over any V2X sidelink transmission (i.e. irrespectively of the sidelink MAC PDU's PPPP).

Resource pool for transmission of pedestrian UE (P-UE) may be overlapped with resources for V2X sidelink communication. For each transmission pool, resource selection mechanism (i.e. random selection, partial sensing based selection or either random selection or partial sensing based selection), which is allowed to be used in this pool, is also configured. If P-UE is configured to use either random selection or partial sensing based selection for one transmission pool, it is up to UE implementation to select a specific resource selection mechanism. If the P-UE is configured to use partial sensing based selection only, the P-UE shall use partial sensing based selection in the pool. The P-UE shall not do random selection in the pool wherein only partial sensing is allowed. If the eNB does not provide a random selection pool, the P-UEs that support only random selection cannot perform sidelink transmission. In exceptional pool, the P-UE uses random selection.

It is not mandatory for P-UE to support zone based resource selection. The P-UE reports whether it supports zone based resource selection as part of UE capability signalling. If the P-UE supports zone based resource selection, the network can provide zone based configuration via only dedicated signalling.

Power saving of P-UE can be achieved by UE implementation and upper layer mechanisms. P-UE do not perform CBR measurement. However, P-UE shall adjust the transmission parameter. The configuration parameters for transmission parameter adaption can be provided to the P-UE via RRC signaling.

To support the co-existence of CEN DSRC and V2X sidelink communication, the upper layers of the UE which is performing V2X sidelink communication send an indication to lower layers when the UE is within the proximity of CEN DSRC tolling station(s).

For unicast transmission of V2X messages, the V2X message can be delivered via Non-GBR bearers as well as GBR bearers. In order to meet the QoS requirement for V2X message delivery for V2X services, a Non-GBR QCI value and a GBR QCI value for V2X messages are used.

For broadcasting V2X messages, SC-PTM or MBSFN transmission can be used. In order to reduce SC-PTM/MBSFN latency, shorter (SC-)MCCH repetition period for SC-PTM/MBSFN, modification period for SC-PTM/MBSFN and MCH scheduling period for MBSFN are supported. Reception of downlink broadcast of V2X messages in different carriers/PLMNs can be supported by having multiple receiver chains in the UE.

Coexistence Between a UE Using Mode 3 and a UE Using Mode 4

The UE supporting V2X sidelink communication can operate in two modes for resource allocation:

Scheduled resource allocation (a UE using mode 3), characterized by:

The UE needs to be RRC_CONNECTED in order to transmit data;

The UE requests transmission resources from the eNB. The eNB schedules transmission resources for transmission of sidelink control information and data. Sidelink SPS (Semi-persistent scheduling) is supported for scheduled resource allocation;

UE autonomous resource selection (a UE using mode 4), characterized by:

The UE on its own selects resources from resource pools and performs transport format selection to transmit sidelink control information and data;

If mapping between the zones and V2X sidelink transmission resource pools is configured, the UE selects V2X sidelink resource pool based on the zone UE is located in.

The UE performs sensing for (re)selection of sidelink resources. Based on sensing results, the UE (re)selects some specific sidelink resources and reserves multiple sidelink resources. Up to 2 parallel independent resource reservation processes are allowed to be performed by the UE. The UE is also allowed to perform a single resource selection for its V2X sidelink transmission.

As described above, a method for an eNB to directly designate a transmission resource of a V2X transmission UE is referred to as a mode 3 (or transmission mode 3, TM3). If a transmission resource region is configured in advance or an eNB designates the transmission resource region and a UE directly selects a transmission resource from the transmission resource region, it is referred to as a mode 4 (or transmission mode 4, TM4).

Hereinafter, The UE using mode 3 (or 1) can be represented as UE3, and The UE using mode 4 (or 2) can be represented as UE4.

In NR, same resource pools and same scheduling assignment format can be used as Rel 14 (which can be decoded by Rel-14 Ues), without causing significant degradation to Rel-14 PC5 operation compared to that of Rel-14 UEs.

In this situation, the PC5 functionalities can be supported as follows.

a) Carrier aggregation (up to 8 PC5 carriers);
b) 64QAM;
c) Reduce the maximum time between packet arrival at Layer 1 and resource selected for transmission;
d) Radio resource pool sharing between UEs using mode 3 and UEs using mode 4;

According to the PC5 functionalities, the UE3 and UE4 can be sharing the same resource pool. In addition, the UE3 and UE4 can be operated with the SPS configuration. And, The UE4 can configure periodical resources for sidelink transmission by itself without the SPS configuration.

In this situation, since the UE4 is autonomous selects a transmission resource from the shared same resource pool, a network or base station allocating a transmission resource to the UE3 cannot know that the transmission resources are overlapped repeatedly in time or frequency domain.

Hereinafter, the overlapping of transmission resources transmitted or scheduled by UE3 and UE4 in the time and/or frequency domain is referred to as a collision.

If the first sidelink transmission and the second sidelink transmission are expected to occur at the same time, the UE can determine that a collision will occur.

Or, if the first transmission and the second transmission are expected to occur at the same time and a part of resources scheduled by the scheduling information and the SCI are overlapped in frequency domain, the UE can determine that a collision will occur.

Or, if the first transmission and the second transmission are expected to occur at the same time and all resources scheduled by the scheduling information and the SCI are overlapped in frequency domain, the UE can determine that a collision will occur.

Because of this, it is necessary to introduce the method/apparatus for avoiding a collision between transmission resources of UE3 and UE4 within the shared same resource pool.

Based on the above discussion, a method in which a terminal connected to a base station (e.g eNB or gNB) communicates with another terminal more efficiently is proposed.

Figure 9:
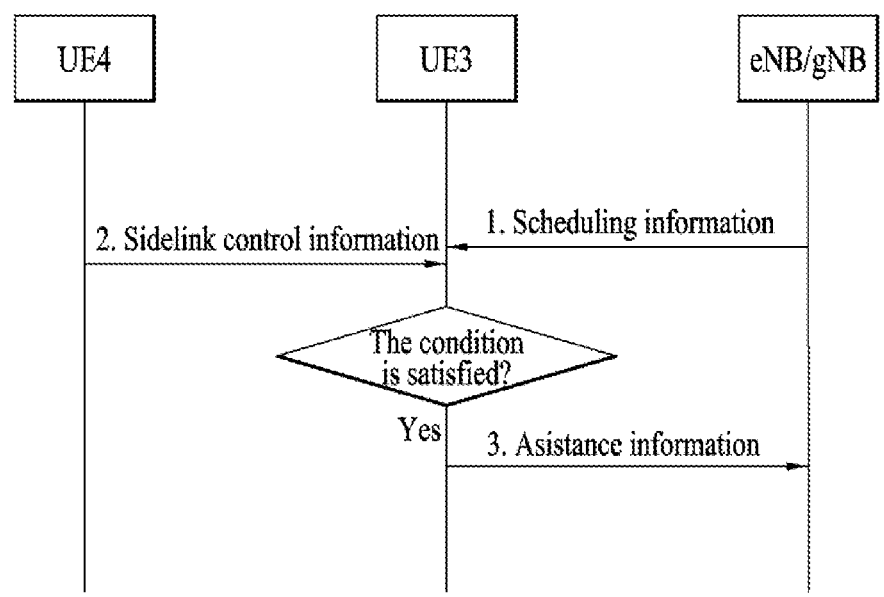
FIG. 9 shows an example of the present invention.

FIG. 9 shows an example of the present invention for reducing collisions and reporting collision status in a wireless communication system. The UE operating for the present invention can be the UE3.

Referring to FIG. 9, the method for reducing collisions and reporting collision status, performed by the UE is as follows.

Step 1) The UE Receives the Scheduling Information for Sidelink Transmission from the Network (or Base Station, eNB or gNB).

The scheduling information indicates one or more resources for sidelink transmission by the UE3. The scheduling information can be received via RRC signalling (e.g. RRC Connection Configuration/Reconfiguration). The scheduling information can includes at least one sidelink SPS configuration.

For sidelink SPS, maximum 8 SPS configurations with different parameters can be configured by eNB and all SPS configurations can be active at the same time. The activation/deactivation of SPS configuration is signalled via PDCCH by eNB. The existing logical channel prioritization based on PPPP is used for sidelink SPS.

The scheduling information can be received with threshold information. The threshold information includes a threshold value relevant for the number of collisions over sidelink.

The threshold value can be any positive integer number.

If the threshold value is received, the UE can count the number of collisions between a sidelink transmission of the UE and that of one or more of other UEs. The collisions counted by the UE can be expected collisions or occurred collisions.

The threshold value can be associated with an unit time. The UE receives the threshold value and the unit time in this case.

If the unit time is received with the threshold value, the UE counts the number of expected or occurred/skipped collisions over a unit time period. The counted number of collisions is regarded as the number of collisions/collided transmissions. The unit time period can be configured as a time period, symbol period, slot period, subframe period or radio frame period.

If the UE determines that the transmission of the UE itself is expected to collide with transmissions of other UE, the UE can skip transmission instead of collision. Details of skipping is decrbied below.

Even if the unit time is not received, the UE can count the number of expected or occurred/skipped collisions over a predetermined fixed unit time period.

The start time and the end/reset time of the unit time can be included in the threshold information.

The threshold information can include at least one of SPS index information, priority information, service/application information. The threshold value and the unit time can be associated with at least one of the SPS configuration, priority, service/application.

If the SPS index information is received by the UE, the UE counts the number of expected or occurred collisions per activated sidelink SPS configuration. The UE activates the sidelink SPS configuration by receving associated downlink control information (DCI).

If the SPS index information is received and skipping is performed by the UE, the UE counts the number of skipping per activated sidelink SPS configuration.

Then, the UE compares the number of expected or occurred/skipped collisions with the threshold value associated with the activated sidelink SPS configuration (with the linked/concerned SPS index).

The UE can count the number of skipping over a unit time period associated with the activated SPS configuration.

If the priority information is received by the UE, the UE counts the number of expected or occurred collisions per associated priorities.

If the priority information is received and skipping is performed by the UE, the UE counts the number of skipping per associated priorities.

Then, the UE compares the number of expected or occurred/skipped collisions with the threshold value associated with the linked/concerned priorities. The priority can mean a PPPP (ProSe Per Packet Priority) associated with a logical channel.

The UE can count the number of skipping over a unit time period associated with the a logical channel.

If the service/application information is received by the UE, the UE counts the number of expected or occurred collisions per associated service/application.

If the service/application information is received and skipping is performed by the UE, the UE counts the number of skipping per associated service/application.

Then, the UE compares the number of expected or occurred/skipped collisions with the threshold value associated with the linked/concerned service/application. The service can be public safety/non-public safety.

The UE can count the number of skipping over a unit time period associated with the service/application.

Step 2) The UE Receives the Sidelink Control Information (SCI) from the another UE.

The sidelink control information (SCI) indicates one or more resources for sidelink transmission by another UE. The one or more resources indicated by the SCI can be configured to have a periodicity. The SCI can be received by the UE from the another UE. The SCI can be received by the UE3 from the UE4.

As decribed in FIG. 7, the one or more resources (one resource unit) can be periodically and repeatedly appear in D2D communcation. The same applies to v2x communication. The periodically and repeatedly appeared one or more resources can be configured by the UE4.

The UE can estimates transmission timing of another UE using the SCI.

If the scheduled transmission timing of the UE and the estimated transmission timing of another UE overlaps, the UE can determine that the collision has occurred or is expected.

Whether the collision has ouccured can be determined through the SCI of the another UE and the transmission location of the previous transmission of the UE. Whether the collision is expected can be determined by the UE through the periodicity information of another UE and the scheduling information on the UE.

Step 3) the UE Transmits the Assistance Information to the Network when the Condition is Satisfied.

The assistance information (or UE assistance information) can be provided to eNB according to the condition.

And, reporting of the assistance information can be configured by eNB for V2X sidelink communication. The assistance information used for V2X sidelink communication includes traffic characteristic parameters (e.g. a set of preferred expected SPS interval, timing offset with respect to subframe 0 of the SFN 0, PPPP and maximum TB size based on observed traffic pattern) related to the SPS configuration. The assistance information can be reported in case either SPS is already configured or not. Triggering of assistance information transmission is left to UE implementation. For instance, the UE is allowed to report assistance information when change in estimated periodicity and/or timing offset of packet arrival occurs. SR mask per traffic type is not supported for V2X sidelink communication.

In addition, the condition can be associated with a collision between the first sidelink transmission and the second sidelink transmission.

The collision can be expected by the UE using the scheduling information and the SCI.

Specifically, the UE can know time/frequency resources to be used by the UE itself through the scheduling information, and the UE can know time/frequency resources to be used by the another US through the SCI. If the resources are overlapped time and/or frequency domain, the UE can determine that a collision will occur.

If the compared number of expected or happened collisions with the threshold value is equal to or larger than the thresholde value, the UE can deteremine that the condition is satisfied.

The assistance information can includes at least one of:

a) SPS index; If one or more sidelink SPS configurations are activated, information on a sidelink SPS configuration in which the number of expected/occurred collisions is equal to or larger than the threshold value can be reported. Or, information on a sidelink SPS configuration in which the UE want to activate.

b) The number of collided transmissions (expected collisions) or the number of collided transmission per unit time (The unit time can be configured or fixed);

c) The location of the collided transmission or the location of resources in which the collision is expected; The information on the location described as SFN (system frame number) or subframe number. The information on the location described as bitmap. For instance, value '1' in the bitmap indicates the collided transmission (resources in which the collision is expected/occurred). Starting position of the bitmap (SFN/subframe number or offset from the referenced time) can also be provided to the network.

d) Channel busy ratio (CBR) of the resource pools;

Skipping of Transmission

If the UE determines that the transmission of the UE itself is expected to collide with transmissions of other UE, the UE can skip transmission instead of collision. In this case, the UE counts the number of skipped transmission and compares the number of skipped transmission with the above stated threshold. The number of skipped transmission can be counted per unit time. If the number of skipped transmissions (or the number of skipped transmissions per unit time) is equal to and/or above the threshold, the UE reports the assistance information.

Transmission mode of UE performing skipping can be mode 3. Transmission mode of other UE is mode 3 or mode 4.

Whether to perform the above skipping can be configured by the netword or UE itself. If the skipping is configured, the UE skips the transmission if the transmission of the UE is expected to have collision with that of another UE. Otherwise, the UE does not skip the transmission even if transmission of the UE is expected to have collision with that of another UE.

Whether to perform the above skipping can be configured per sidelink SPS configuration or activated SPS configuration. If skipping is allowed for a certain sidelink SPS configuration, the UE skips the transmission of the data granted by the SPS grant for the certain sidelink SPS configuration if the transmission of the UE is expected to have collision with that of another UE. If skipping is not allowed for a certain SPS configuration, the UE does not skip the transmission of data granted by the SPS grant for the certain sidelink SPS configuration even if the transmission of the UE is expected to have collision with that of another UE.

The above behaviour of counting the number of expected collisions or collided/skipped transmission can be only applied to transmission of the UE3. Furthermore, the above behaviour of counting the number of expected collisions or collided/skipped transmission can be applied to UE with sidelink SPS configuration (transmission in SPS grant), or to UE configured with periodical resources.

The UE shall consider itself to be allowed to deny any transmission in a particular UL subframe if during the number of subframes indicated by a higher layer parameter (autonomousDenialValidity), preceeding and including this particular subframe, it autonomously denied fewer UL subframes than indicated by a higher layer parameter (autonomousDenialSubframes).

autonomousDenialValidity and autonomousDenialSubframes can be included a higher layer paramer (OtherConfig), as described in Table 1.

TABLE 1 corresponds to 200 subframes, sf500 corresponds to 500 subframes and so on.

Figure 10:
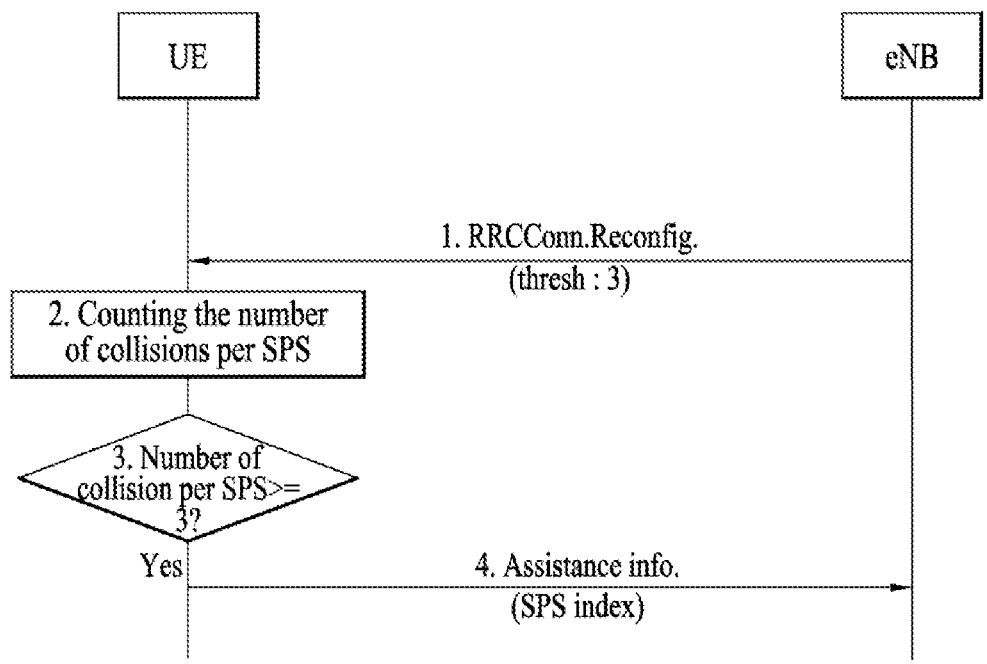
FIG. 10 shows another example of the present invention.

FIG. 10 shows another example of the present invention.

Referring to FIG. 10, the method for avoiding a collision and reporting collision status by the UE is performed as follows.

Step 1) The UE is configured with threshold value (e.g. 3) which is common for all activated SPS.

Step 2) The UE counts the number of collisions per activated sidelink SPS. The UE counts the numbers of subframes which is overlapped with transmission time of other UEs.

Step 3) The UE compares the number of collisions per activated SPS with the threshold number.

Step 4) If the number of collisions of at least one sidelink SPS is equal to or larger than the threshold, the UE initiates the transmission of assistance information. The assistance information includes the SPS index which has collisions equal to or larger than the threshold value.

With this invention, the network is able to acquire the sidelink transmission status of the UE so that the network may adjust the transmission resources. This would result that the collisions between UEs using the same resource pool is reduced so that the sidelink messages is transmitted over sidelink stably.

Figure 11:
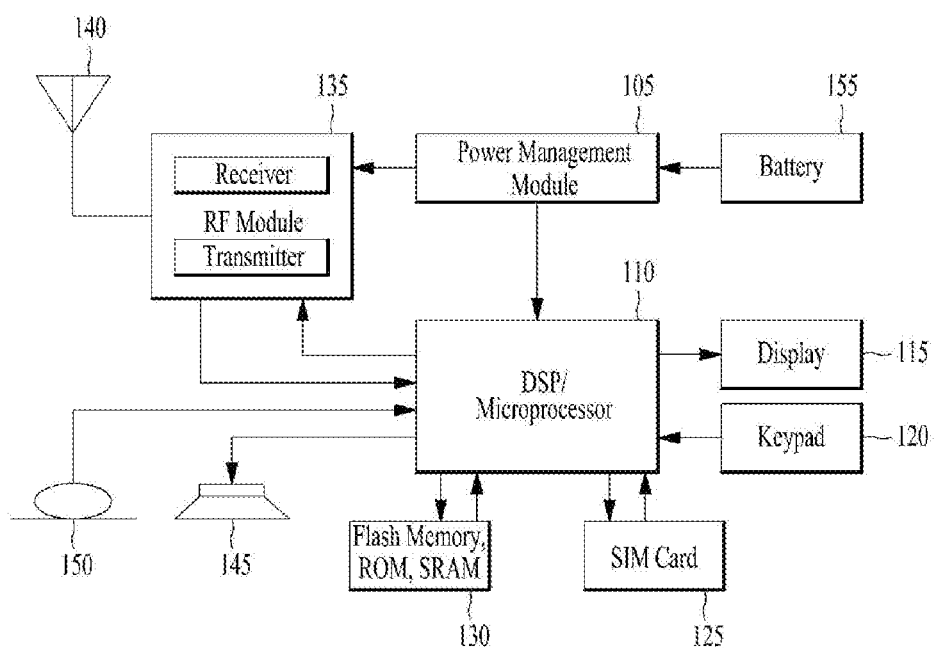
FIG. 11 is a block diagram of a communication apparatus according to an embodiment of the present invention.

FIG. 11 is a block diagram of a communication apparatus according to an embodiment of the present invention.

The apparatus shown in FIG. 11 can be a user equipment (UE) and/or eNB (or gNB) adapted to perform the above mechanism, but it can be any apparatus for performing the same operation.

As shown in FIG. 11, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 11 may represent a UE comprising a receiver (135) configured to receive radio signals from a network, and a transmitter (135) configured to transmit radio signals to the network. These receiver and the transmitter can constitute the transceiver (135). This processor (110) is connected to the transceiver (135: receiver and transmitter), and configured to implement the procedures and/or methods proposed by the present invention.

Also, FIG. 11 may represent a network apparatus (e.g., eNB or gNB) comprising a transmitter (135) configured to transmit radio signals to a UE and a receiver (135) configured to receive radio signals from the UE. These transmitter and receiver may constitute the transceiver (135). The network further comprises a processor (110) connected to the transmitter and the receiver. This processor (110) is connected to the transceiver (135: receiver and transmitter), and configured to implement the procedures and/or methods proposed by the present invention.

The embodiments of the present invention described herein are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE and NR system, the present invention is applicable to a variety of wireless communication systems in addition to the 3GPP LTE and NR system.

What is claimed is:

1. A method of transmitting and receiving signals by a user equipment (UE) in a wireless communication system, the method comprising:
   receiving, from a base station (BS), scheduling information indicating one or more first resources to be used by the UE for a first sidelink transmission;
   receiving, from the BS, threshold information including a threshold value;
   receiving, from the BS, downlink control information (DCI) for activating at least one sidelink semi-persistent scheduling (SPS) configuration, wherein the at least one sidelink SPS configuration is included in the scheduling information;
   receiving, from another UE, sidelink control information (SCI) indicating one or more second resources to be used by the another UE for a second sidelink transmission; and
   transmitting, to the BS, assistance information on a collision expected between the first sidelink transmission and the second sidelink transmission based on the scheduling information and the SCI when a condition is satisfied,
   wherein the assistance information is transmitted when a number of expected collisions is equal to or larger than the threshold value,
   wherein the number of expected collisions is counted per an activated one of the at least one sidelink SPS configuration, and
   wherein the assistance information includes an index of a sidelink SPS configuration in which the number of expected collisions is equal to or larger than the threshold value.

2. The method of claim 1, wherein the one or more second resources are periodically configured.

3. The method of claim 1, wherein the threshold information includes at least one of:
   priority information associated with the threshold value, or service/application information associated with the threshold value.

4. The method of claim 1, wherein the assistance information includes at least one of:
   the number of expected collisions,
   a system frame number of one or more first resources that the collision expected,
   a subframe number of the one or more first resources that the collision expected,
   a bitmap of the one or more first resources that the collision expected, or
   a channel busy ratio for a sidelink resource pool.

5. The method of claim 1, further comprising:
   skipping transmission of sidelink signal at one or more first resources that the collision is expected.

6. A user equipment (UE), which transmits and receives signals in a wireless communication system, the UE comprising:
   a radio frequency (RF) unit; and
   a processor,
   wherein the processor is configured to:
   receive, from a base station (BS), scheduling information indicating one or more first resources to be used by the UE for a first sidelink transmission,
   receive, from the BS, threshold information including a threshold value,
   receive, from the BS, downlink control information (DCI) for activating at least one sidelink semi-persistent scheduling (SPS) configuration, wherein the at least one sidelink SPS configuration is included in the scheduling information,
   receive, from another UE, sidelink control information (SCI) indicating one or more second resources to be used by the another UE for a second sidelink transmission, and
   transmit, to the BS, assistance information on collision expected between the first sidelink transmission and the second sidelink transmission based on the scheduling information and the SCI when a condition is satisfied,
   wherein the assistance information is transmitted when a number of expected collisions is equal to or larger than the threshold value,
   wherein the number of expected collisions is counted per an activated one of the at least one SPS configuration, and
   wherein the assistance information includes an index of a sidelink SPS configuration in which the number of expected collisions is equal to or larger than the threshold value.

7. The UE of claim 6, wherein the one or more second resources are periodically configured.

8. The UE of claim 6, wherein the threshold information includes at least one of:
   priority information associated with the threshold value, or
   service/application information associated with the threshold value.

9. The UE of claim 6, wherein the assistance information includes at least one of:
    the number of expected collisions,
    a system frame number of one or more first resources that the collision expected,
    a subframe number of the one or more first resources that the collision expected,
    a bitmap of the one or more first resources that the collision expected, or
    a channel busy ratio for a sidelink resource pool.

10. The UE of claim 6, wherein the processor is further configured to:
    skip transmission of sidelink signal at one or more first resources that the collision is expected.

11. The method of claim 1, wherein the UE is capable of communicating with at least one of a second another UE, a UE related to an autonomous driving vehicle, a second base station or a network.

12. The UE of claim 6, wherein the UE is capable of communicating with at least one of a second another UE, a UE related to an autonomous driving vehicle, a second base station or a network.

\* \* \* \* \*